United States Patent
Shichino (10) Patent No.: US 8,010,146 B2
(45) Date of Patent: Aug. 30, 2011

(54) COMMUNICATION APPARATUS AND TRANSMISSION POWER CONTROL METHOD THEREOF

(75) Inventor: Takahiro Shichino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 640 days.

(21) Appl. No.: 11/737,968

(22) Filed: Apr. 20, 2007

(65) Prior Publication Data

US 2007/0249384 A1 Oct. 25, 2007

(30) Foreign Application Priority Data

Apr. 21, 2006 (JP) .................................. 2006-118445

(51) Int. Cl.
*H04B 7/00* (2006.01)
*H04B 1/00* (2006.01)
*H04Q 11/12* (2006.01)

(52) U.S. Cl. .......... 455/522; 455/69; 455/127.1; 455/78
(58) Field of Classification Search .................. 455/522, 455/69, 127.1
See application file for complete search history.

(56) References Cited

U.S. PATENT DOCUMENTS

| | | | |
|---|---|---|---|
| 5,905,914 A | 5/1999 | Sakai et al. | |
| 5,931,964 A | 8/1999 | Beming et al. | |
| 5,943,610 A * | 8/1999 | Endo ............................... | 455/69 |
| 5,987,326 A * | 11/1999 | Tiedemann et al. .......... | 455/442 |
| 6,119,018 A | 9/2000 | Kondo | |
| 6,185,432 B1 * | 2/2001 | Vembu ........................... | 455/522 |
| 6,272,355 B1 * | 8/2001 | Lokio ............................. | 455/522 |
| 6,377,813 B1 * | 4/2002 | Kansakoski et al. .......... | 455/522 |
| 6,477,389 B1 * | 11/2002 | Kim ................................ | 455/522 |
| 6,519,236 B1 * | 2/2003 | Haartsen et al. ............... | 370/332 |
| 6,587,696 B1 * | 7/2003 | Ma et al. ........................ | 455/522 |
| 6,666,822 B2 * | 12/2003 | Agano ........................... | 600/437 |
| 6,708,041 B1 * | 3/2004 | Butovitsch et al. ........... | 455/522 |
| 6,744,754 B1 * | 6/2004 | Lee ................................. | 370/342 |
| 6,904,291 B2 | 6/2005 | Miyamoto et al. | |
| 7,088,691 B2 | 8/2006 | Fujita | |
| 7,096,034 B2 * | 8/2006 | Zhang et al. ................... | 455/522 |
| 7,123,881 B2 | 10/2006 | Agin | |
| 7,133,703 B2 | 11/2006 | Aoshima et al. | |
| 7,146,183 B2 * | 12/2006 | Sato et al. ...................... | 455/522 |
| 7,206,596 B2 | 4/2007 | Nishio | |
| 7,409,223 B2 * | 8/2008 | Hamabe ......................... | 455/522 |
| 7,786,869 B2 * | 8/2010 | Yamada ..................... | 340/572.1 |

(Continued)

FOREIGN PATENT DOCUMENTS

CN 1267173 A 9/2000

(Continued)

OTHER PUBLICATIONS

Office Action dated Nov. 14, 2007 of corresponding Korean Patent Application 10-2006-0132395.

(Continued)

*Primary Examiner* — Tilahun Gesesse
(74) *Attorney, Agent, or Firm* — Canon USA Inc. IP Division (57) ABSTRACT

In a communication apparatus having a transmission-power control function of controlling transmission power, the operation state of the communication apparatus is determined. If the communication apparatus is determined as a data-transmitting side, control is done to validate the transmission-power control function. If the communication apparatus is determined as a data-receiving side, control is done to invalidate the transmission-power control function.

18 Claims, 10 Drawing Sheets

U.S. PATENT DOCUMENTS

| | | |
|---|---|---|
| 2003/0071912 A1 | 4/2003 | Minakuti |
| 2003/0162497 A1 | 8/2003 | Curtiss et al. |
| 2004/0005906 A1 | 1/2004 | Okumura et al. |
| 2004/0038717 A1 | 2/2004 | Mahany et al. |
| 2004/0088641 A1 | 5/2004 | Torsner et al. |
| 2004/0106441 A1 | 6/2004 | Kazakevich et al. |
| 2006/0046651 A1 | 3/2006 | Hazell et al. |
| 2007/0104159 A1* | 5/2007 | Su et al. ......................... 370/338 |
| 2007/0149140 A1 | 6/2007 | Yamamoto |

FOREIGN PATENT DOCUMENTS

| | | |
|---|---|---|
| EP | 1450516 | 8/2004 |
| GB | 2 369 961 | 6/2002 |
| JP | 08-088579 | 4/1996 |
| JP | 09-275373 | 10/1997 |
| JP | 09-326754 | 12/1997 |
| JP | 2002-064512 A | 2/2002 |
| JP | 2002-223168 A | 8/2002 |
| JP | 2002-290320 A | 10/2002 |
| JP | 2003-046436 A | 2/2003 |
| JP | 2003-078470 A | 3/2003 |
| JP | 2003-347943 | 12/2003 |
| JP | 2003-348010 A | 12/2003 |
| JP | 2006-087023 | 3/2006 |
| KR | 2002-0096819 | 12/2002 |
| KR | 1020030042475 A | 5/2003 |
| RU | 2 175 466 | 10/2001 |
| WO | 01/24568 | 4/2001 |
| WO | 02/41521 | 5/2002 |
| WO | 2004/019519 | 3/2004 |
| WO | 2004/077761 | 9/2004 |

OTHER PUBLICATIONS

Notice of Allowance dated Nov. 12, 2007 of corresponding Russian Application 2006146040/09(050308) and translation.
Korean Office Action dated Dec. 24, 2008 concerning application 10-2007-0037290.
Korean Office Action dated May 30, 2008 concerning application 10-2007-0037290.
European Search Report dated May 15, 2007 for European counterpart patent application No. 06025435.6-2412.
USPTO Office Action dated Nov. 12, 2009 for related case U.S. Appl. No. 11/610,580.
Office Action dated May 18, 2010 for Related U.S. Appl. No. 11/610,580.

* cited by examiner

COMMUNICATION APPARATUS AND TRANSMISSION POWER CONTROL METHOD THEREOF

CROSS-REFERENCE TO RELATED APPLICATIONS

This application claims the benefit of Japanese Patent Application No. 2006-118445, filed Apr. 21, 2006, which is hereby incorporated by reference herein in its entirety.

BACKGROUND OF THE INVENTION

1. Field of the Invention

The present invention relates to transmission power control of a communication apparatus.

2. Description of the Related Art

Public radio communications and the like have already implemented transmission power control of battery-driven communication apparatuses and prolonged their driving time. Various schemes have been proposed to control transmission power. For example, patent reference 1: U.S. Pat. No. 6,119,018 (Japanese Patent Laid-Open No. 9-326754) describes a technique of causing a host station to transmit an optimum transmission power control signal to a mobile station. The mobile station subordinately controls its transmission power in accordance with the signal.

PTP (Picture Transfer Protocol) is an image transfer protocol by camera control. A side to request PTP session establishment is called an initiator. The other side to respond to the request is called a responder. After PTP session establishment, command-response communication is done so that the initiator requests an operation, and the responder responds to it. The PTP is popularly used in, e.g. digital still cameras (to be referred to as DSCs hereinafter) and printers.

A communication apparatus that subordinately controls its transmission power in accordance with an instruction from a control station, as in the above-described public radio communication, can minimize the transmission power. Even a communication apparatus that executes autonomous transmission power control can reduce the transmission power if the transmission power of the communication partner is fixed.

However, when a pair of communication apparatuses (e.g., DSCs with built-in wireless LAN) autonomously controls their transmission power, the transmission power of each communication apparatus may be too high or too low. This may increase power consumption or disable communication. For example, in wireless LAN based on IEEE802.11b, the temporal length of a maximum data packet transmitted from a transmitting-side communication apparatus is about eight times that of an acknowledge packet transmitted from a receiving-side communication apparatus. Hence, an increase in power consumption of the transmitting-side communication apparatus poses a problem from the viewpoint of power saving.

SUMMARY OF THE INVENTION

The present invention realizes to efficiently control the transmission power even when a pair of communication apparatuses has a function of autonomously performing transmission power control.

Moreover, the present invention realizes to fix the transmission power of a receiving-side communication apparatus even when a pair of communication apparatuses has a function of autonomously control transmission power.

According to one aspect of the present invention, there is provided a communication apparatus having a transmission power control function for controlling transmission power, comprising: a determination unit configured to determine whether the communication apparatus is a data-transmitting side or a data-receiving side; and a control unit configured to control the transmission power on the basis of a determination result of the determination unit.

According to another aspect of the present invention, there is provided a transmission-power control method for a communication apparatus having a transmission power control function to control transmission power, comprising: determining whether the communication apparatus is on a data-transmitting side or a data-receiving side; and controlling the transmission power on the basis of a determination result in the determining step.

Further features of the present invention will become apparent from the following description of exemplary embodiments with reference to the attached drawings.

DESCRIPTION OF THE EMBODIMENTS

The best mode for carrying out the present invention will be described below in detail with reference to the accompanying drawings.

First Embodiment

Figure 1:
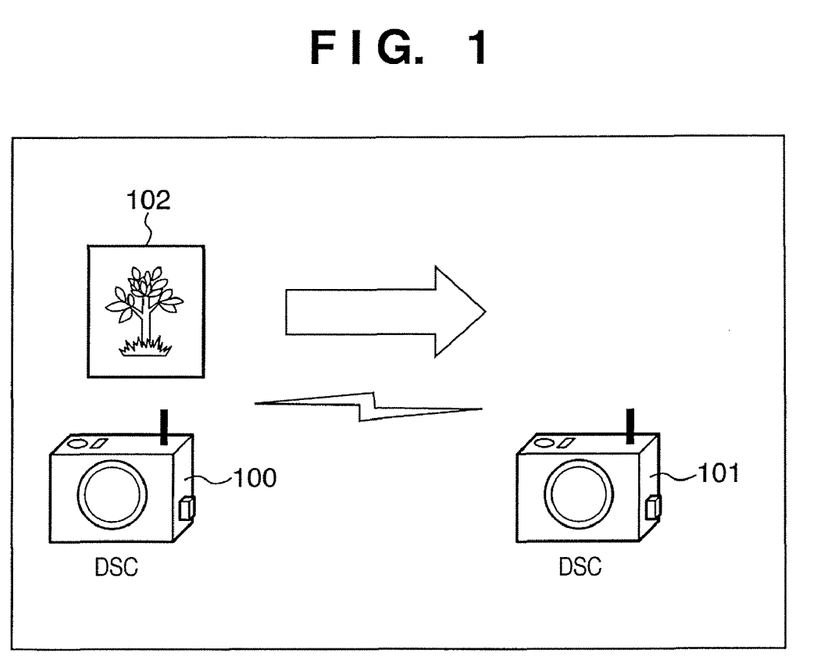
FIG. 1 is a view showing an example of the configuration of a communication system according to the first embodiment.

FIG. 1 is a view showing an example of the configuration of a communication system according to the first embodiment. In this communication system, two digital still cameras (DSCs) serving as communication apparatuses connect to each other in an ad hoc mode of wireless LAN. The DSCs 100 and 101 use PTP (Picture Transfer Protocol) as a communication protocol. In this example, the DSC 100 transmits image data 102 to the DSC 101.

The hardware configuration of the DSCs 100 and 101 shown in FIG. 1 will be explained. The DSCs 100 and 101 have the same arrangement.

Figure 2:
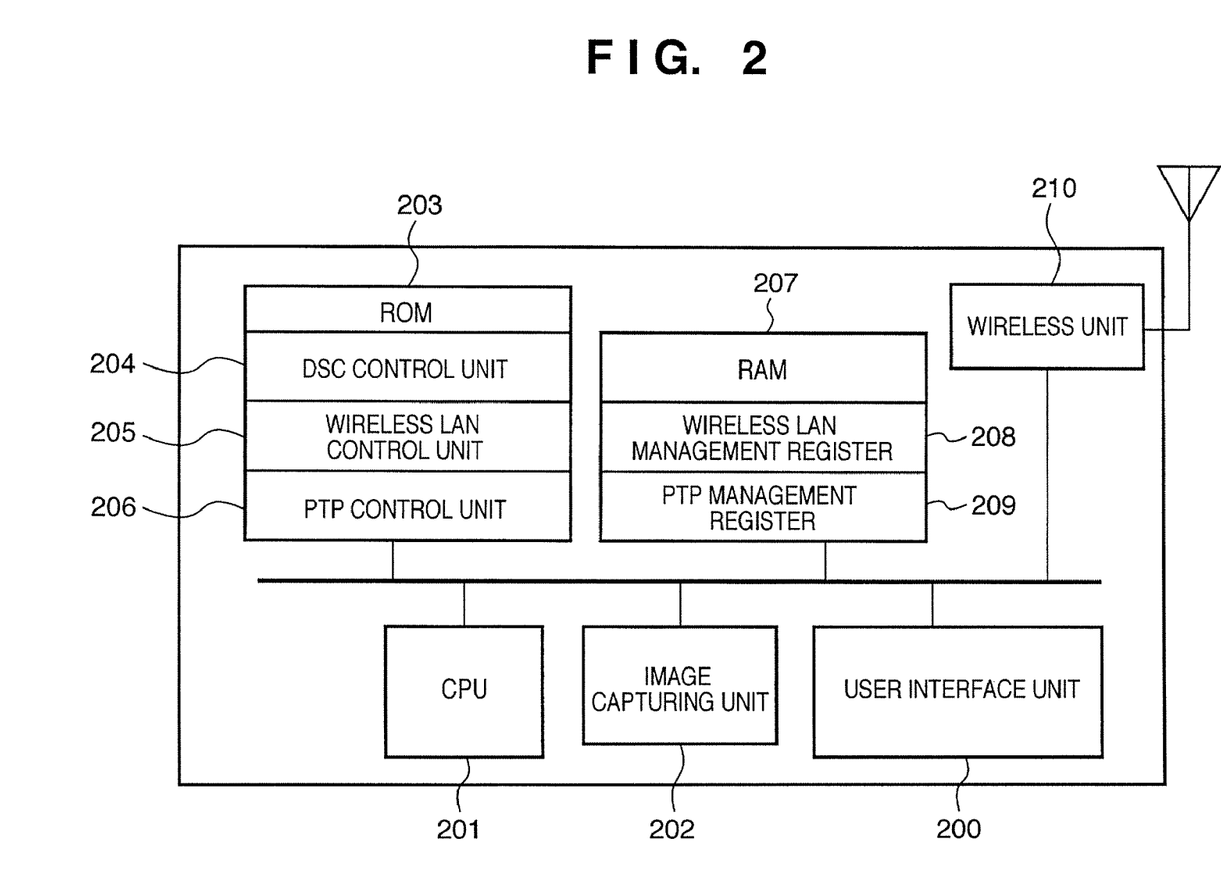
FIG. 2 is a block diagram showing an example of the arrangement of a digital still camera (DSC)

FIG. 2 is a block diagram showing an example of the arrangement of the digital still camera (DSC). Referring to FIG. 2, a user interface unit 200 including a liquid crystal display screen and keys or a touch panel serves as an interface used by the user to control the DSC. A CPU 201 controls the entire DSC in accordance with programs stored in a ROM to be described later. An image-capturing unit 202 inputs image data photoelectrically converted by a CCD (not shown).

A ROM 203 stores data and programs to be executed by the CPU 201. A DSC control unit 204 in the ROM 203 stores a program to control the entire DSC. A wireless-LAN control unit 205 stores a program to control wireless LAN. A PTP control unit 206 stores a program to control the PTP.

A RAM 207 is a memory in which a work area for the CPU 201 and various kinds of registers to be described later in detail are defined. A wireless-LAN management register 208 in the RAM 207 manages the state of wireless LAN. A PTP-management register 209 manages the state of PTP.

A wireless unit 210 controls wireless communication with another DSC connected in an ad hoc mode complying with IEEE802.11x.

Various kinds of programs stored in the above-described ROM 203 are expanded on the RAM 207. The CPU 201 executes the expanded programs.

Transmission power control according to the first embodiment in transmitting the image data 102 from the DSC 100 to the DSC 101 with the above arrangement will be described with reference to FIGS. 3 and 4.

Figure 3:
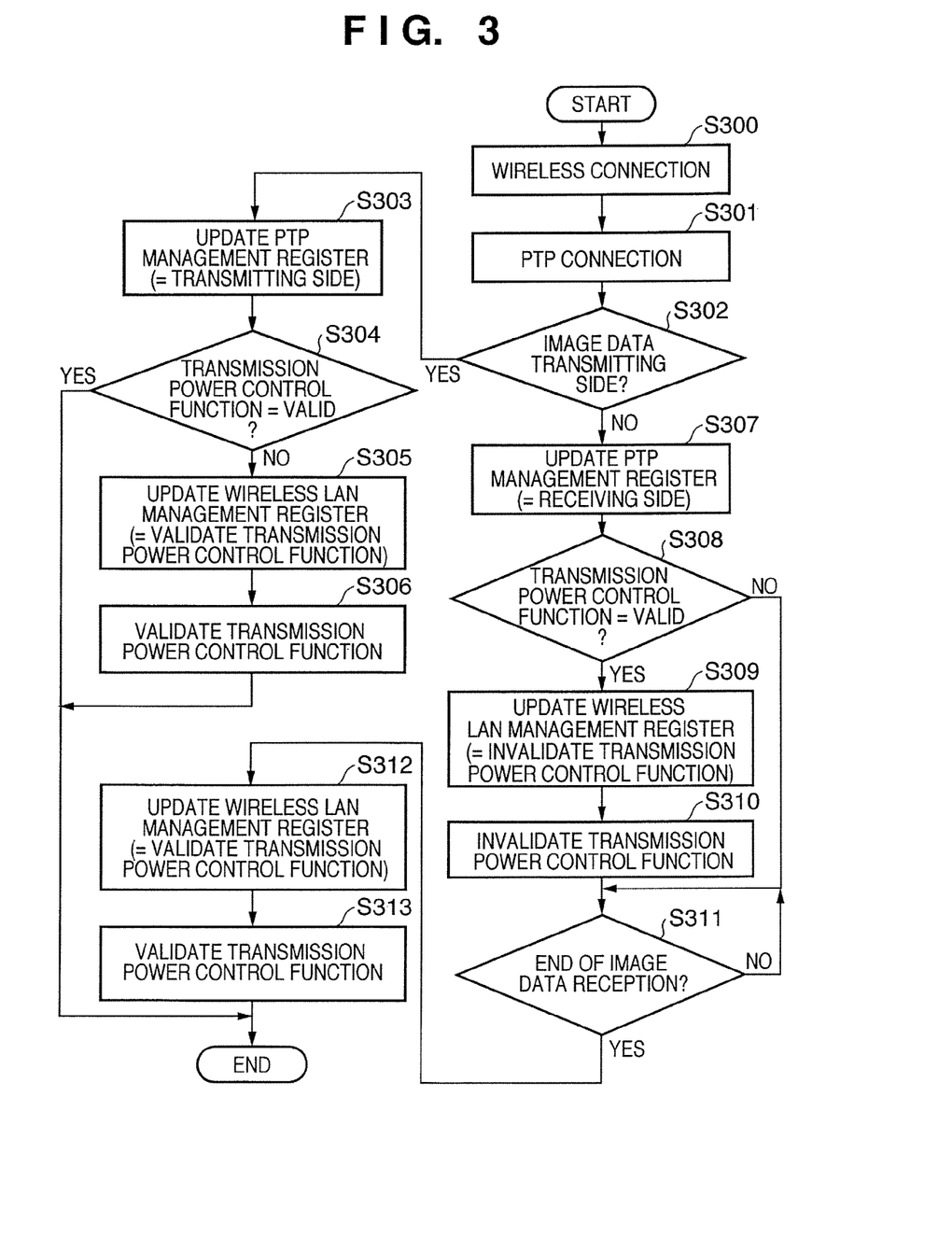
FIG. 3 is a flowchart showing transmission power control according to the first embodiment.
Figure 4:
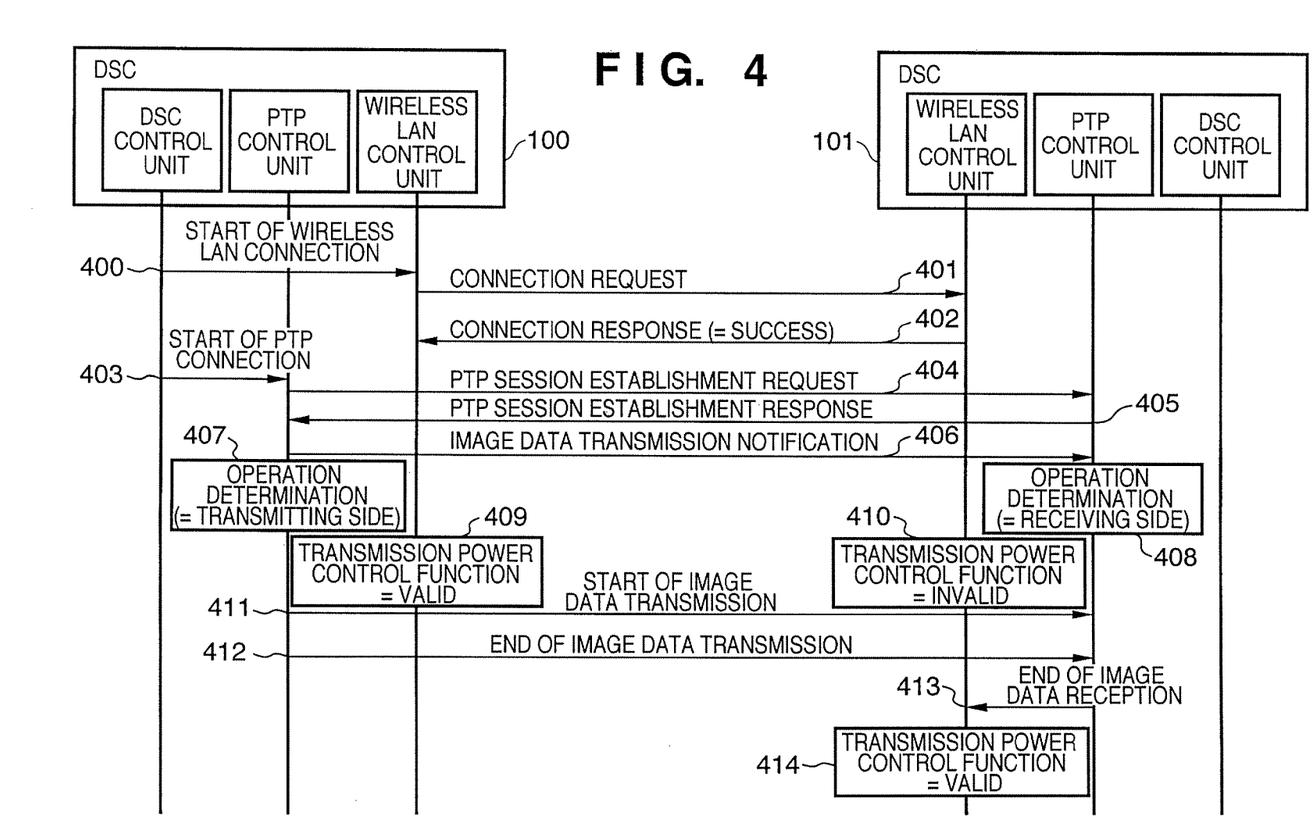
FIG. 4 is a sequence chart showing the sequence between DSCs 100 and 101 according to the first embodiment.

FIG. 3 is a flowchart showing transmission power control according to the first embodiment. FIG. 4 is a sequence chart showing the sequence between the DSCs 100 and 101 according to the first embodiment.

In step S300, the user of the DSC 100 selects wireless-LAN connection to the DSC 101 by operating the user-interface unit 200. The DSC control unit 204 of the DSC 100 gives the instruction to the wireless-LAN control unit 205 to start wireless-LAN connection to the DSC 101 (400). The wireless-LAN control unit 205 sends a connection request (401) to the wireless-LAN control unit 205 of the DSC 101. The DSC 100 transmits the connection request (401) to the DSC 101 via the wireless unit 210.

Wireless communication between the DSCs 100 and 101 is done by their wireless units 210, and a description thereof will be omitted here.

Upon receiving the connection request 401 from the DSC 100, the wireless-LAN control unit 205 of the DSC 101 transmits a connection response (=success) (402) to the DSC 100. Wireless-LAN connection is thus established.

When wireless-LAN connection is established, the process advances to step S301. The DSC control unit 204 of the DSC 100 sends a PTP connection start instruction (403) to the PTP control unit 206. In accordance with the instruction, the PTP control unit 206 sends a PTP session establishment request (404) to the PTP control unit 206 of the DSC 101.

Upon receiving the PTP session establishment request (404) from the DSC 100, the PTP control unit 206 of the DSC 101 transmits, to the DSC 100, a PTP session establishment request response (405) corresponding to the PTP session establishment request (404). A PTP session is thus established between the PTP control unit 206 of the DSC 100 and the PTP control unit 206 of the DSC 101.

In the above-described PTP connection, the DSC 100 serves as the initiator, and the DSC 101 serves as the responder. The DSCs 100 and 101 execute communication by PTP.

The operation of the DSC 100 after PTP session establishment is as follows. First, the user of the DSC 100 selects the image data 102 to be transmitted to the DSC 101 by operating the user-interface unit 200. The PTP control unit 206 sends an image-data transmission notification (406) to the PTP control unit 206 of the DSC 101. The PTP control unit 206 interprets the notification (406) transmitted by itself and determines that the DSC 100 is the data-transmitting side (YES in step S302, 407).

The PTP control unit 206 stores data representing the data-transmitting side in the PTP management register 209 (S303). The wireless-LAN control unit 205 determines by referring to the wireless-LAN management register 208 whether the transmission power control function is valid (S304). If the function is invalid (NO in step S304), data representing that the transmission power control function is valid is stored in the wireless-LAN management register 208 (S305), thereby validating the transmission power control function (S306, 409). The PTP control unit 206 of the DSC 100 starts transmitting the image data 102 to the DSC 101 (411). When transmission of the image data 102 finishes, the PTP control unit 206 sends an image-data transmission completion notification (412).

Upon receiving the image-data transmission notification (406), the PTP control unit 206 of the DSC 101 interprets the image-data transmission notification (406) and determines that the DSC 101 is the data-receiving side (NO in step S302, 408).

The PTP control unit 206 stores data representing the data-receiving side in the PTP management register 209 (S307). The wireless-LAN control unit 205 determines by referring to the wireless-LAN management register 208 whether the transmission power control function is valid (S308). If the function is valid (YES in step S308), data representing that the transmission power control function is invalid is stored in the wireless-LAN management register 208 (S309), thereby invalidating the transmission power control function (S310, 410). The PTP control unit 206 of the DSC 101 receives the transmission start notification (411). When reception of the image data 102 finishes (412), the PTP control unit 206 sends an image-data reception completion notification (413) to the wireless-LAN control unit 205. Upon receiving the notification, the wireless-LAN control unit 205 stores data representing the validity of the transmission power control function in the wireless-LAN management register 208 (S312), thereby validating the transmission power control function (S313).

If the transmission power control function of the DSC 101 is invalid (NO in step S308), the process advances to a reception process of the image data 102 to determine whether reception is ended (S311).

As described above, the data-transmitting side or receiving side is determined by the communication protocol (PTP). The data-transmitting side validates the transmission power control function. The data-receiving side invalidates the transmission power control function. This process fixes the transmission power of the DSC 101 on the data-receiving side during data reception. The transmission power of the DSC 100 on the data-transmitting side is prevented from being too high or too low. The DSC 101 on the data-receiving side validates the transmission power control function when data reception finishes. It is possible to reduce power consumption in modes besides data reception.

Consider DSC product specifications in which the initiator in PTP is the data-transmitting side, whereas the responder is the image-data receiving side. In this case, it is possible to determine the image-data transmitting side or receiving side by causing the DSCs 100 and 101 to interpret the PTP session establishment request (404) and PTP session-establishment request response 405.

The first embodiment has been described assuming a system with a pair of DSCs using PTP as a communication protocol. Any communication apparatus other than the DSC is also usable. The communication protocol can also be any other type such as FTP.

Second Embodiment

The second embodiment of the present invention will be described next in detail with reference to the accompanying drawings. In this embodiment, it is important to fix the transmission power of the communication apparatus on the data-receiving side. In the first embodiment, the "transmission power control function is invalidated" to fix the transmission power of the communication apparatus on the data-receiving side. In the second embodiment, a method of fixing transmission power on the data-receiving side by updating a register to set transmission power will be described.

The arrangements of the communication system and DSC of the second embodiment are the same as those of the first embodiment described with reference to FIG. 1, and a description thereof will be omitted.

Transmission power control according to the second embodiment in transmitting image data 102 from a DSC 100 to a DSC 101 will be described with reference to FIGS. 5 to 9.

Figure 5:
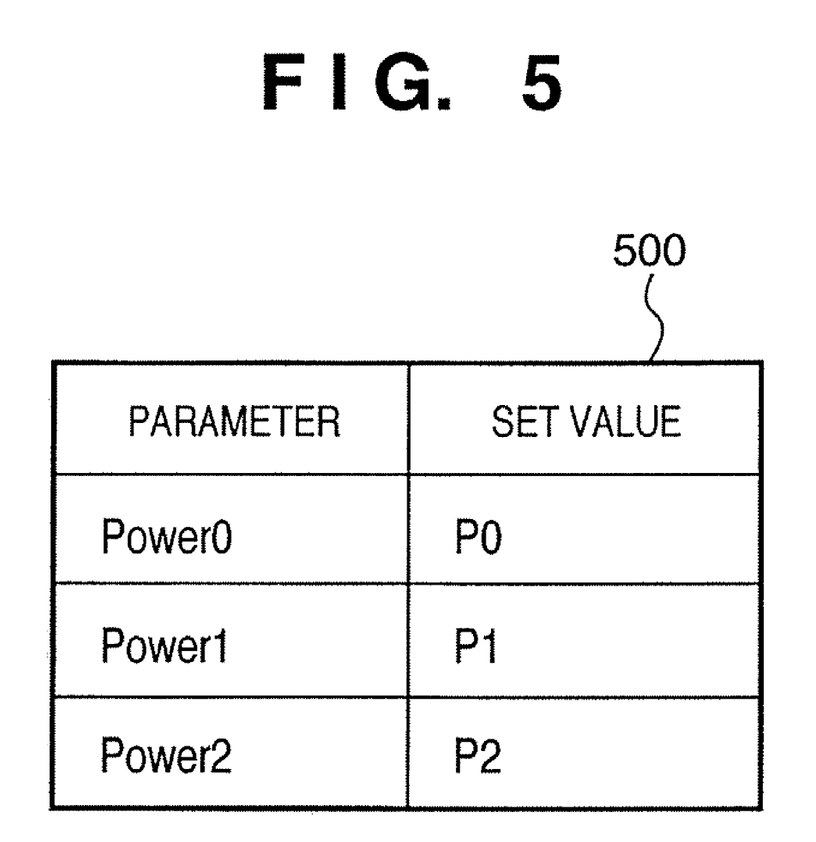
FIG. 5 is a view showing an example of set values in a transmission power control register according to the second embodiment.

FIG. 5 is a view showing an example of set values in a transmission power control register according to the second embodiment. The transmission power control register shown in FIG. 5 is associated with the transmission power control function and included in a wireless-LAN management register 208. Parameters and set values 500 to control transmission power stepwise are set in the transmission power control register in correspondence with each other.

In FIG. 5, transmission power is defined in three steps: Power0, Power1, and Power2. P0, P1, and P2 are stored as the set values 500 (P0<P1<P2).

Figure 6:
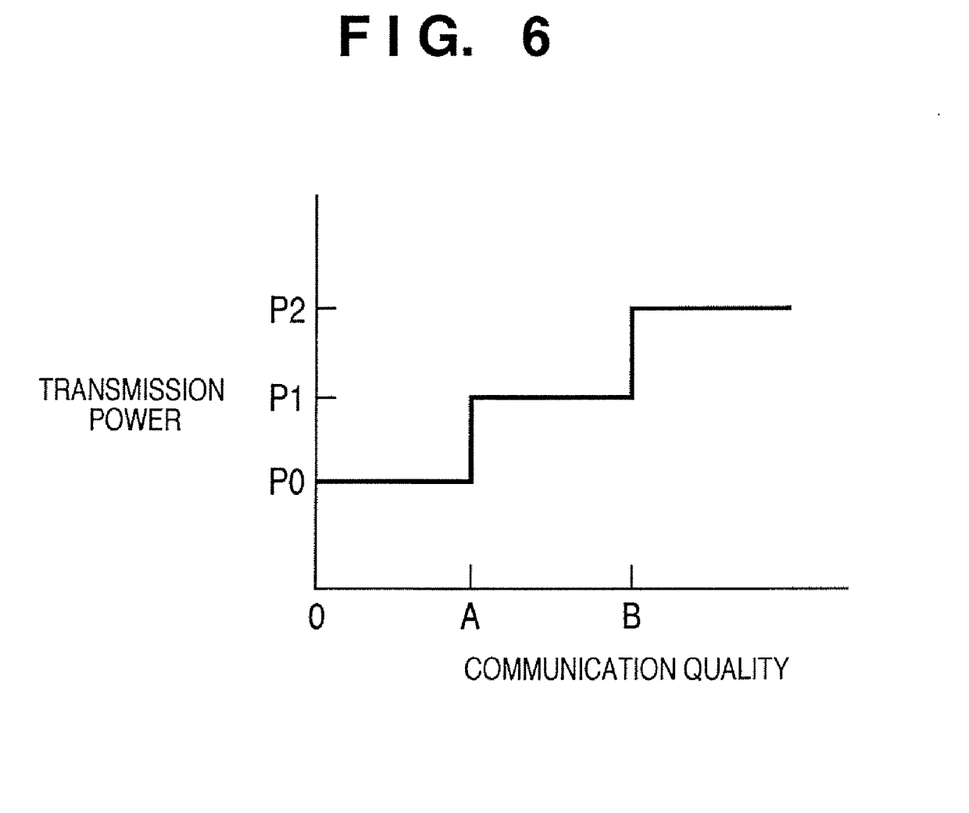
FIG. 6 is a graph showing the relationship between the communication quality and the transmission power in a transmission power control function.

FIG. 6 is a graph showing the relationship between the communication quality and the transmission power in the transmission power control function. Referring to FIG. 6, the abscissa represents the communication quality. The communication quality becomes poor as its value increases. The ordinate represents the magnitude of transmission power. P2 is the maximum power. As shown in FIG. 6, the transmission power control function increases the transmission power as the communication quality becomes poor.

Figure 7:
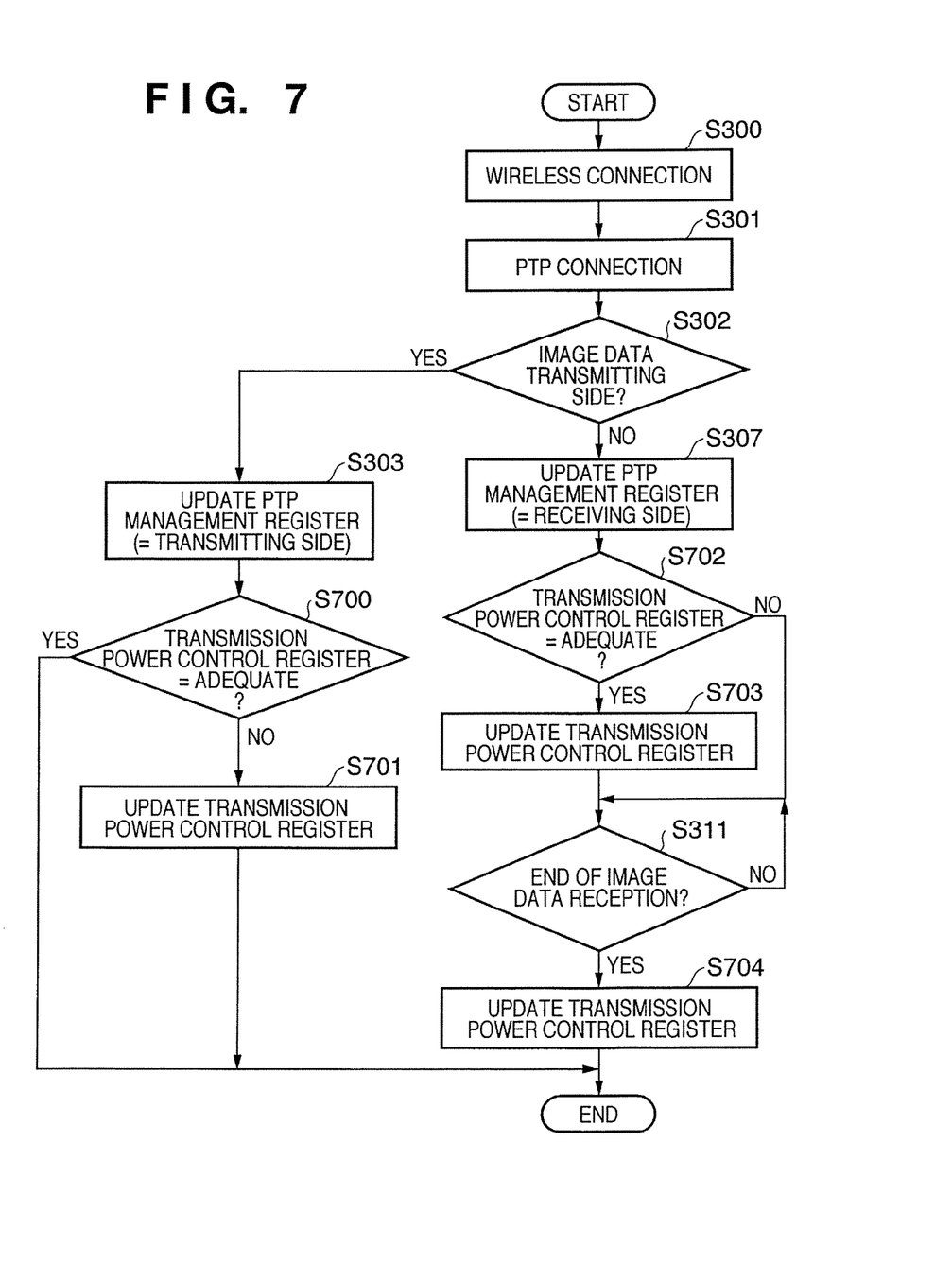
FIG. 7 is a flowchart showing transmission power control according to the second embodiment.
Figure 8:
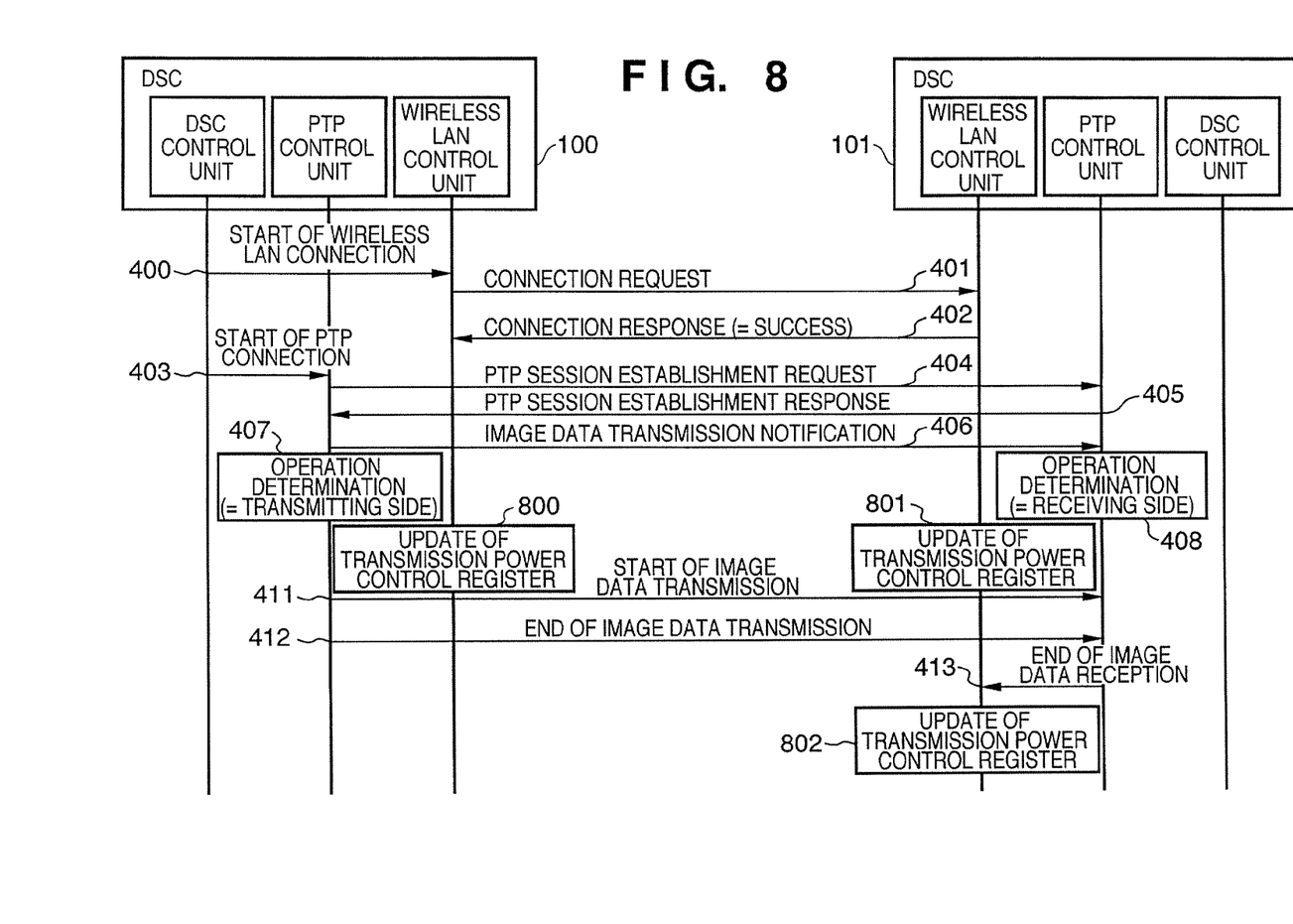
FIG. 8 is a sequence chart showing the sequence between DSCs 100 and 101 according to the second embodiment.
Figure 9:
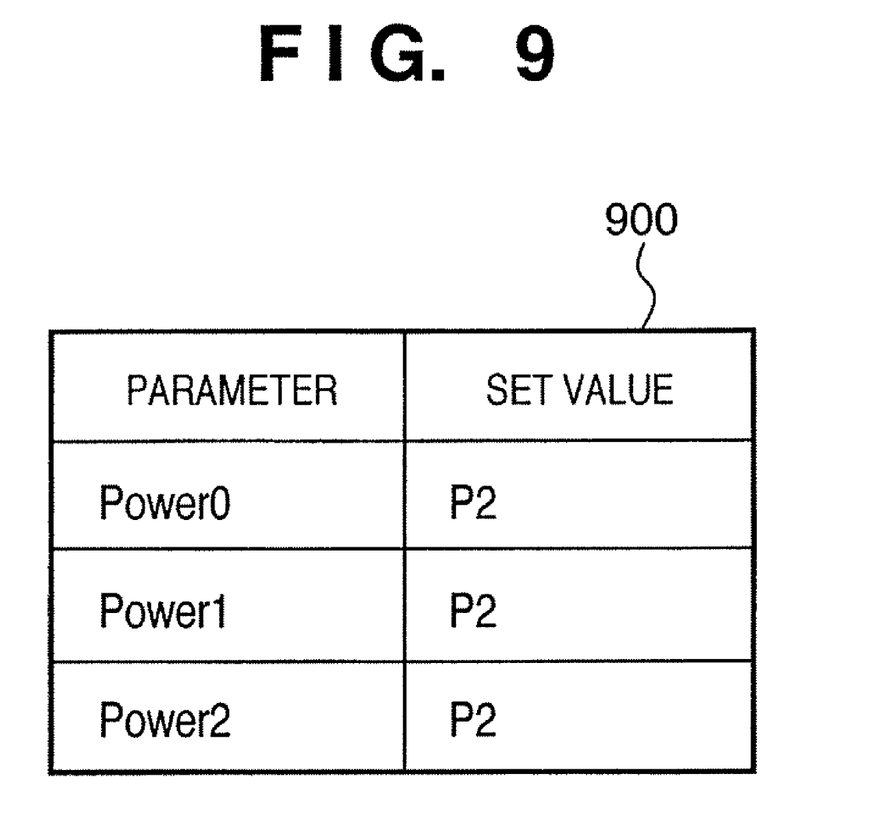
FIG. 9 is a view showing an example of set values in a transmission power control register according to the second embodiment.

FIG. 7 is a flowchart showing transmission power control according to the second embodiment. FIG. 8 is a sequence chart showing the sequence between the DSCs 100 and 101 according to the second embodiment. FIG. 9 is a view showing an example of the set values in the transmission power control register according to the second embodiment. The same step numbers as in the first embodiment denote the same processes in the second embodiment, and a detailed description thereof will be omitted.

As in the first embodiment, the DSCs 100 and 101 are wirelessly connected (S300, 400 to 402). PTP connection is done (S302, 403 to 405). A PTP session is established. The DSC 100 sends an image-data transmission notification (406) to the DSC 101. A PTP control unit 206 of the DSC 101 determines that the apparatus is the data-receiving side (NO in step S302, 408).

In step S307, the PTP control unit 206 stores data representing the data-receiving side in a PTP management register 209. A wireless-LAN control unit 205 of the DSC 101 determines by referring to the transmission power control register in the wireless-LAN management register 208 whether current transmission power control is adequate (S702). If the transmission power control register has the set values 500 shown in FIG. 5, the wireless-LAN control unit 205 determines that the current transmission power control is inadequate because the transmission power varies depending on the communication quality, as shown in FIG. 6. The wireless-LAN control unit 205 updates the set values in the transmission power control register to set values 900 shown in FIG. 9 (S703, 801).

According to the set values 900 in the transmission power control register shown in FIG. 9, all the parameters Power0, Power1, and Power2 are set to the same value P2. Hence, the transmission power is fixed.

If the wireless-LAN control unit 205 of the DSC 101 detects the end of reception of the image data 102 (YES in step S311), the set values in the transmission power control register are updated again to the set values 500 shown in FIG. 5 (S704, 802). With this process, the DSC 101 can validate the transmission power control function and reduce power consumption when image-data reception finishes.

On the other hand, the PTP control unit 206 of the DSC 100 determines that the apparatus is the data-transmitting side and stores data representing the data-transmitting side in the PTP management register 209 in step S303. The wireless-LAN control unit 205 refers to the transmission power control register in the wireless-LAN management register 208. If all the set values in the transmission power control register are identical, like the set values 900 in FIG. 9, it is impossible to reduce the transmission power. Hence, the wireless-LAN control unit 205 determines that the set values in the transmission power control register are inadequate (NO in step S700). The set values in the transmission power control register are updated to the set values 500 shown in FIG. 5 (S701). Hence, the DSC 100 can reduce the transmission power depending on the communication quality, as shown in FIG. 6.

As described above, according to the second embodiment, control is done to inhibit the transmission power on the data-receiving side from varying. The transmission power of the DSC 101 on the data-transmitting side is fixed during data reception. The transmission power of the DSC 100 on the data-transmitting side is prevented from being too high or too low. The DSC 101 on the data-receiving side reduces the transmission power when data reception finishes. It is possible to reduce power consumption in modes except data reception.

In the second embodiment, the set values in the transmission power control register are set such that the transmission power of the DSC 101 is fixed during data reception (S703). The same effect as described above can also be obtained by setting values (e.g., Power1=P2, Power2=P2+0.1, and Power3=P2−0.1) near a specific value.

In the first and second embodiments, the data-transmitting side or data-receiving side is determined on the basis of the communication protocol (PTP). However, this determination can also be done by pressing a transmission button or reception button (not shown) on the user interface unit 200.

Third Embodiment

The third embodiment of the present invention will be described next in detail with reference to the accompanying drawings. The first embodiment has been described assuming an ad hoc mode. The same effect is obtained even in an infrastructure mode. The same step numbers as in the first embodiment denote the same processes in the third embodiment, and a detailed description thereof will be omitted.

Note that known communication control is usable between a communication apparatus and an access point if the network form is the infrastructure mode, and a detailed description thereof will be omitted.

Figure 10:
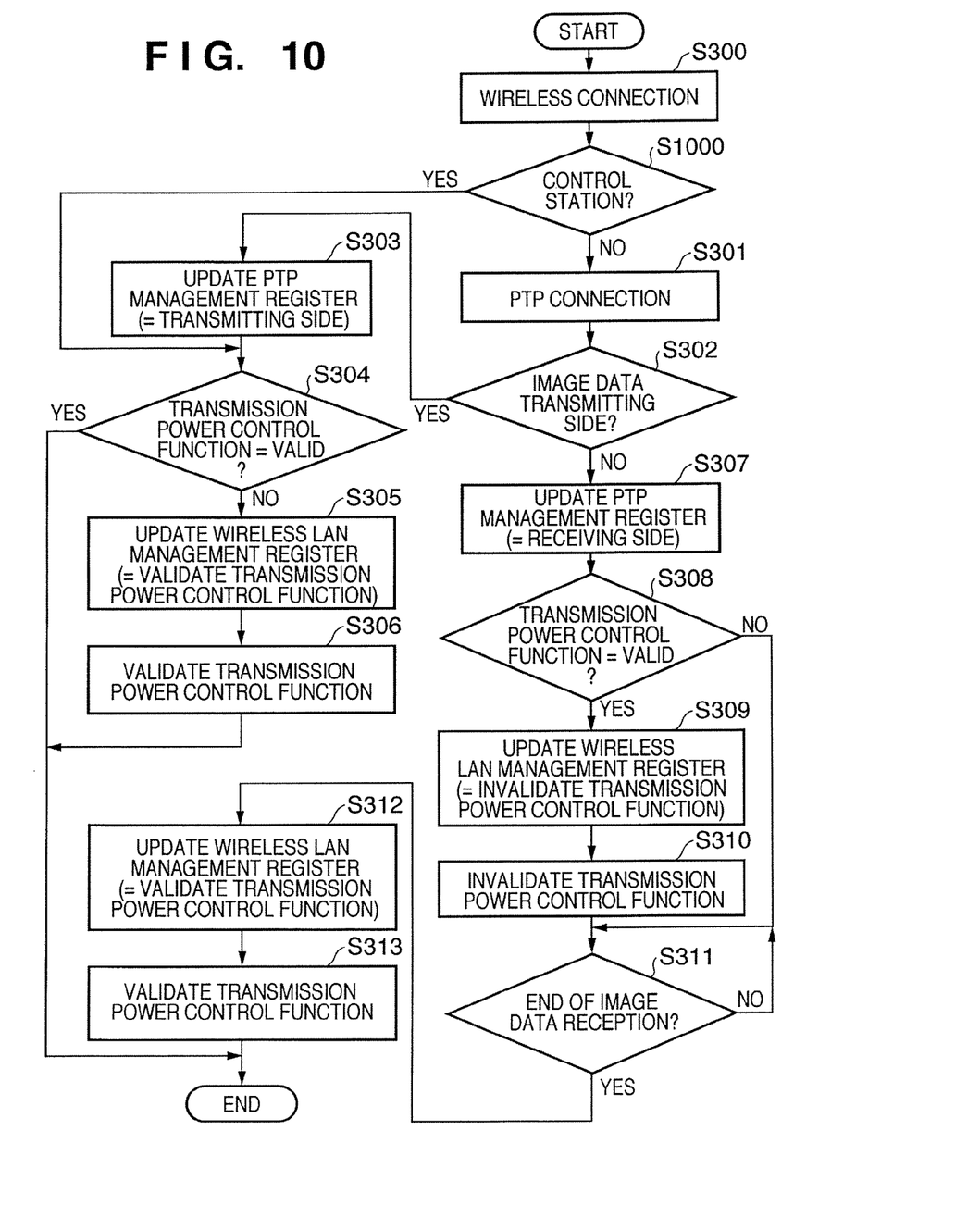
FIG. 10 is a flowchart showing transmission power control according to the third embodiment.

FIG. 10 is a flowchart showing transmission power control according to the third embodiment. As in the first embodiment, wireless-LAN control units 205 of DSCs 100 and 101 execute wireless connection (S300). It is determined whether the network includes an access point (infrastructure mode) (S1000). If the connection partner is an access point, or the user has instructed connection in the infrastructure mode via the operation unit, the network is determined as a network including an access point. If YES in step S1000, the communication partner of the DSCs 100 and 101 is an access point, and its transmission power has a fixed value.

The DSCs 100 and 101 advance to step S304. If the transmission power control function is invalid, a wireless-LAN management register 208 is updated (S305) to validate the transmission power control function (S306). This allows to suitably reduce power consumption.

The determination process in step S1000 may be done by receiving a beacon transmitted from the access point upon wireless connection and determining the presence/absence of a connection relationship with the access point. Alternatively, a communication parameter may be set in advance.

If the network includes no access point, the process from step S301 is executed as in the first embodiment.

Other Embodiment

A recording medium which records software program codes to implement the functions of the above-described embodiments is supplied to a system or apparatus. The computer (or CPU or MPU) of the system or apparatus reads out and executes the program codes stored in the recording medium. This also achieves the objects of the present invention.

In this case, the program codes read out from the recording medium themselves implement the functions of the above-described embodiments. The recording medium that stores the program codes embody the present invention.

Examples of the recording medium to supply the program codes are a flexible disk, hard disk, optical disk, magnetooptical disk, CD-ROM, CD-R, magnetic tape, nonvolatile memory card, and ROM.

The functions of the above-described embodiments are implemented not only by causing the computer to execute the readout program codes but also by causing the OS (Operating System) running on the computer to partially or wholly execute actual processing on the basis of the instructions of the program codes.

The program codes read out from the recording medium are written in the memory of a function expansion board inserted to the computer or a function expansion unit connected to the computer. The CPU of the function expansion board or function expansion unit partially or wholly executes actual processing on the basis of the instructions of the program codes, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus having a transmission power control function for controlling transmission power, the apparatus comprising:
    a first determination unit configured to determine whether the communication apparatus is an image-transmitting side or an image-receiving side, in a case that the communication apparatus communicates with a communication partner apparatus without a base station; and
    a control unit configured to control the transmission power based on a determination result of said first determination unit, wherein said control unit is configured to validate the transmission-power control function if said first determination unit determines that the communication apparatus is the image-transmitting side, and is configured to validate the transmission-power control function in a range smaller than a range of the image-transmitting side or invalidate the transmission-power control function if said first determination unit determines that the communication apparatus is the image-receiving side.

2. An apparatus according to claim 1, wherein in the case that the communication apparatus is determined as the image-receiving side, the control unit is configured to validate the transmission-power control function after an end of image reception from the image-transmitting side.

3. An apparatus according to claim 1, wherein said control unit is configured to control the transmission power by changing a set value of the transmission power.

4. An apparatus according to claim 3, wherein said control unit is configured to change the set value to one of a fixed value and a value near the fixed value.

5. An apparatus according to claim 1, wherein said first determination unit is configured to determine whether the communication apparatus is the image-transmitting side or the image-receiving side by interpreting a message of an image-transfer protocol used between the communication apparatuses.

6. An apparatus according to claim 1, wherein said first determination unit is configured to determine whether the communication apparatus is the image-transmitting side or the image-receiving side in accordance with a user designation via a user interface.

7. An apparatus according to claim 1, further comprising a second determination unit configured to determine whether or not the communication apparatus connects to the base station,
    wherein in the case that said second determination unit determines that the communication apparatus connects to the base station, said control unit is configured to validate the transmission power control function independently of whether the communication apparatus is the image-transmitting side or the image-receiving side.

8. An apparatus according to claim 1, further comprising a second determination unit configured to determine whether or not the communication apparatus connects to the base station,
    wherein said first determination unit is configured to determine whether the communication apparatus is the image-transmitting side or the image-receiving side in accordance with determination by said second determination unit.

9. A transmission-power control method for a communication apparatus having a transmission power control function to control transmission power, the method comprising:
    a first determination step of determining whether the communication apparatus is on an image-transmitting side or an image-receiving side, in a case that the communication apparatus communicates with a communication partner apparatus without a base station; and
    a control step of controlling the transmission power based on a determination result in the first determination step, wherein the control step includes validating the transmission-power control function if it is determined in the first determination step that the communication apparatus is the image-transmitting side, and includes validating the transmission-power control function in a range smaller than a range of the image-transmitting side or invalidating the transmission-power control function if it is determined in the first determination step that the communication apparatus is the image-receiving side.

10. A method according to claim 9, wherein in the case that the communication apparatus is determined as the image-receiving side, the transmission power control function is validated after an end of data reception from the image-transmitting side.

11. A method according to claim 9, wherein in the control step, the transmission power is controlled by changing a set value of the transmission power.

12. A method according to claim 11, wherein in the control step, the set value is changed to one of a fixed value and a value near the fixed value.

13. A method according to claim 9, wherein in the first determination step, it is determined whether the communication apparatus is the image-transmitting side or the image-receiving side by interpreting a message of an image transfer protocol used between the communication apparatuses.

14. A method according to claim 9, wherein in the first determination step, it is determined whether or not the communication apparatus is the image-transmitting side or the image-receiving side in accordance with a user designation via a user interface.

15. A method according to claim 9, further comprising a second determination step of determining whether or not the communication apparatus connects to the base station,
wherein the control step includes validating the transmission-power control function independently of whether the communication apparatus is the image-transmitting side or the image-receiving side if it is determined in the second determination step that the communication apparatus connects to the base station.

16. A method according to claim 9, further comprising a second determination step of determining whether or not the communication apparatus connects to the base station,
wherein in the first determination step, it is determined whether the communication apparatus is the image-transmitting side or the image-receiving side in accordance with determination by the second determination step.

17. A program for causing a computer to execute a transmission power control method set forth in claim 9.

18. A computer-readable recording medium which records a program for causing a computer to execute a transmission power control method set forth in claim 9.

* * * * *